Figure 6:
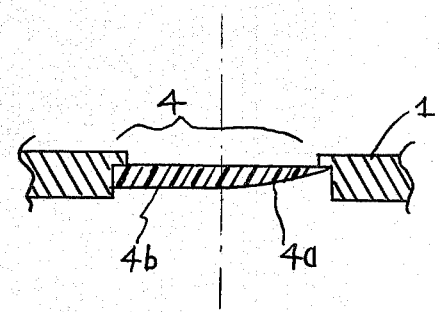

United States Patent [19]

Landon

[11] 3,999,853
[45] Dec. 28, 1976

[54] OPTICAL RANGE FINDER

[76] Inventor: James Michael Landon, 13847 Chandler Blvd., Van Nuys, Calif. 91401

[22] Filed: Oct. 10, 1975

[21] Appl. No.: 621,308

[52] U.S. Cl. ............................................. 356/21
[51] Int. Cl.² ...................................... G01C 3/02
[58] Field of Search ............... 33/276, 277; 356/3, 356/20, 21

[56] References Cited

UNITED STATES PATENTS

| | | | |
|---|---|---|---|
| 2,189,964 | 2/1940 | Sealey | 33/277 |
| 2,423,718 | 7/1947 | Morrison | 356/21 |
| 2,734,273 | 2/1956 | Blindenbacher et al. | 356/21 |
| 3,409,987 | 11/1968 | New | 33/277 |
| 3,907,288 | 9/1975 | Hudak | 33/277 |

Primary Examiner—John K. Corbin
Assistant Examiner—R. A. Rosenberger
Attorney, Agent, or Firm—Gilbert Kivenson

[57] ABSTRACT

An optical range finder is described which makes use of a variable length reference line juxtaposed on a view of a distant object whose height, width or other dimension is known. The user varies the reference line until it matches the known dimension. At this point he can read the distance to the object from a scale. The reference line is a magnified image of a slit which is covered or uncovered by the user to change its length. The relation between the motion of the adjusting means and the corresponding change in slit length is a hyperbola. This linearizes the scale to make for easier interpolation of all values of distance.

4 Claims, 8 Drawing Figures

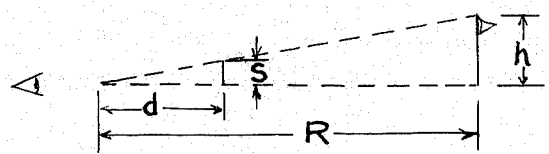
Fig.1
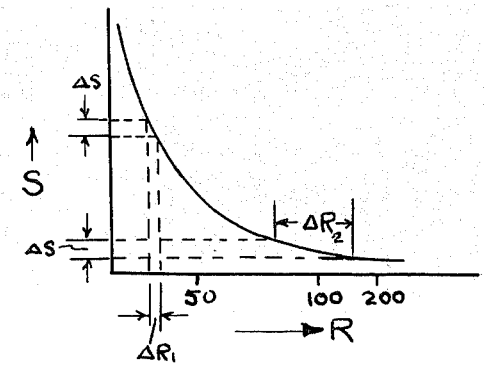
Fig.2
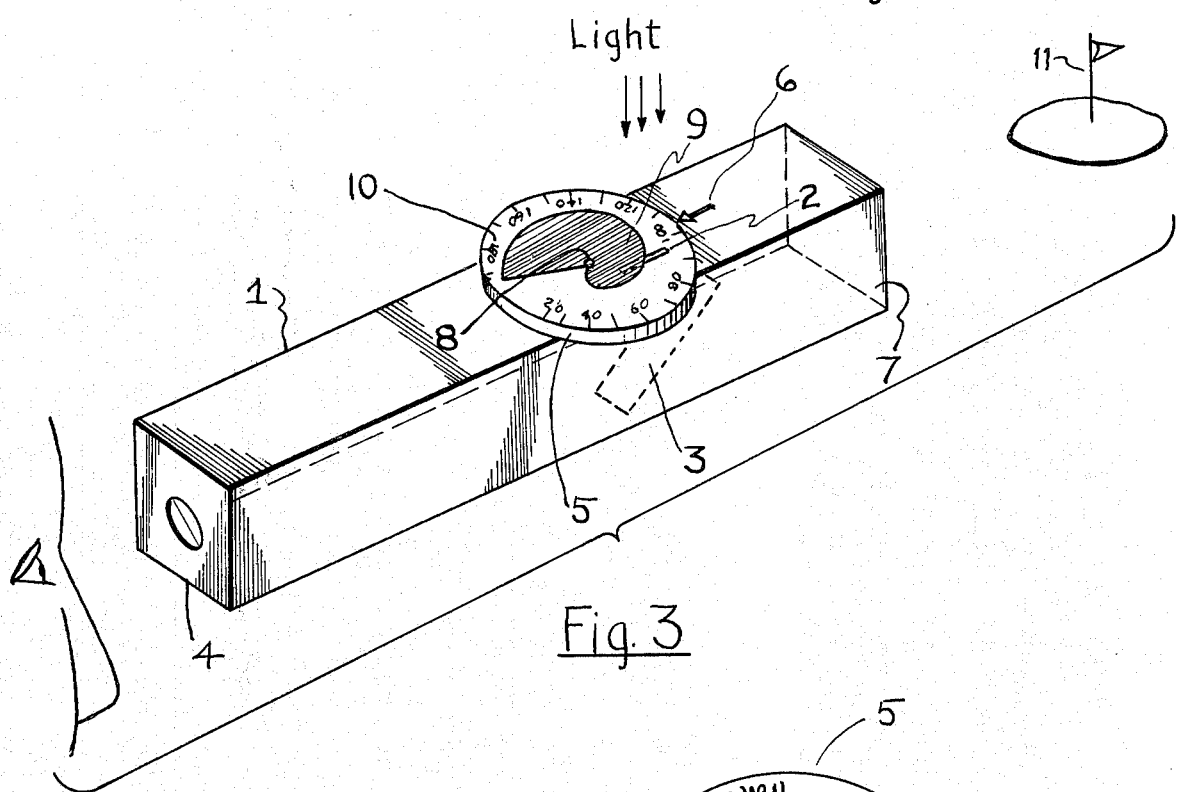
Fig.3
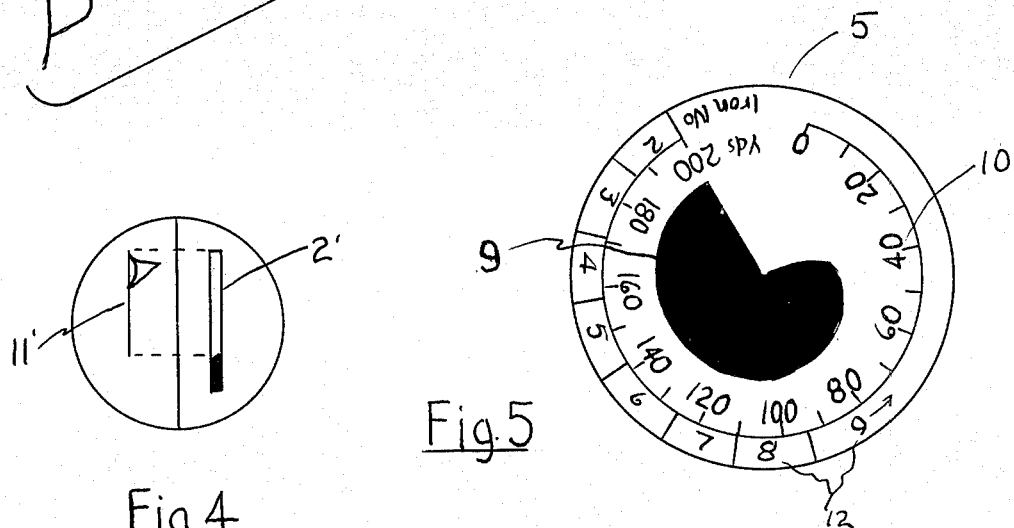
Fig.4
Fig.5

OPTICAL RANGE FINDER

DESCRIPTION

This invention relates to an optical range finder which makes use of the known height, width or other dimension of a selected target as a means of determining the distance between an observer and that target. The problem of rapid range finding occurs in many activities including preliminary land surveys, yachting, golfing, hunting and hiking. Range finders have been developed which utilize a short baseline located at the observer's position. Because of the small baseline and the non-linearity of the measurement these range finders become very inaccurate at distances beyond a few hundred feet unless elaborate mechanisms are used. Instruments which utilize a known dimension of the target have also been devised but the highly non-linear relationship between their indications and target distance makes them difficult to read at the longer ranges. The use of a known dimension of a target can however be the basis of a satisfactory range finding method for several reasons: target dimensions can be many times the base line distance conveniently available at the observer's position and thus permit much greater accuracy than can be obtained with a short base line; target dimensions are often accurately known or can be closely estimated. In golf for example the length of the conventional flag on each green is standardized. In yachting the exact heights of certain landmarks are indicated on nautical charts. The heights of houses and other buildings can be estimated from the number of floors.

It is an object of the present invention to provide a simple and rapid means for the measurement of distances between an observer and a target of known dimension.

Another object is to provide a range finder having a scale with linear subdivisions for convenience and accuracy in reading.

Another object is to provide a compact and inexpensive instrument which can be conveniently carried by the user.

According to the present invention distance is measured by the use of a reference line of varying length. The mechanism which varies the line is in the form of an optical cam so cut that uniform angular rotation produces non-linear length variation. It is thus possible to calibrate the cam with linear subdivisions and to readily interpolate intermediate values of distance. Reference lines in this type of instrument, often called stadia lines, require a relatively complex lens system to achieve optical sharpness. In the present invention clear delineation of the reference line is obtained with a simple magnifying lens.

In a preferred embodiment, the range finder is contained in a tubular case which is partly covered by a rotatable, concentric cylinder. The concentric cylinder carries the optical cam. A longitudinal slit is gradually uncovered as the concentric cylinder is rotated. An eyepiece containing a lens is arranged so that the user can see both the target and a magnified image of the partly uncovered slit. The user adjusts the height of the slit to match the perceived height of the target and then reads the distance from markings on the edge of the concentric cylinder.

Figure 7:
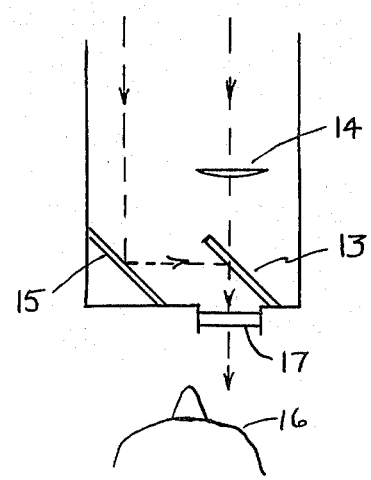

The above mentioned and other objectives and advantages will become apparent from the subsequent description of certain embodiments presented as examples, from the appended claims and from the accompanying drawings in which FIG. 1 illustrates the general principle employed in the range finder, FIG. 2 is a graph showing the non-linear relationship between the perceived height of an object and its distance from the observer, FIG. 3 is a perspective of one embodiment of the invention, FIG. 4 is a view of the target and the adjusted comparison line as seen by the user of the range finder, FIG. 5 shows a somewhat modified form of the disk used with the embodiment of FIG. 3, FIG. 6 illustrates one type of eyepiece suitable for use in the rangefinder, FIG. 7 illustrates a modified form of the eyepiece.

Figure 8:
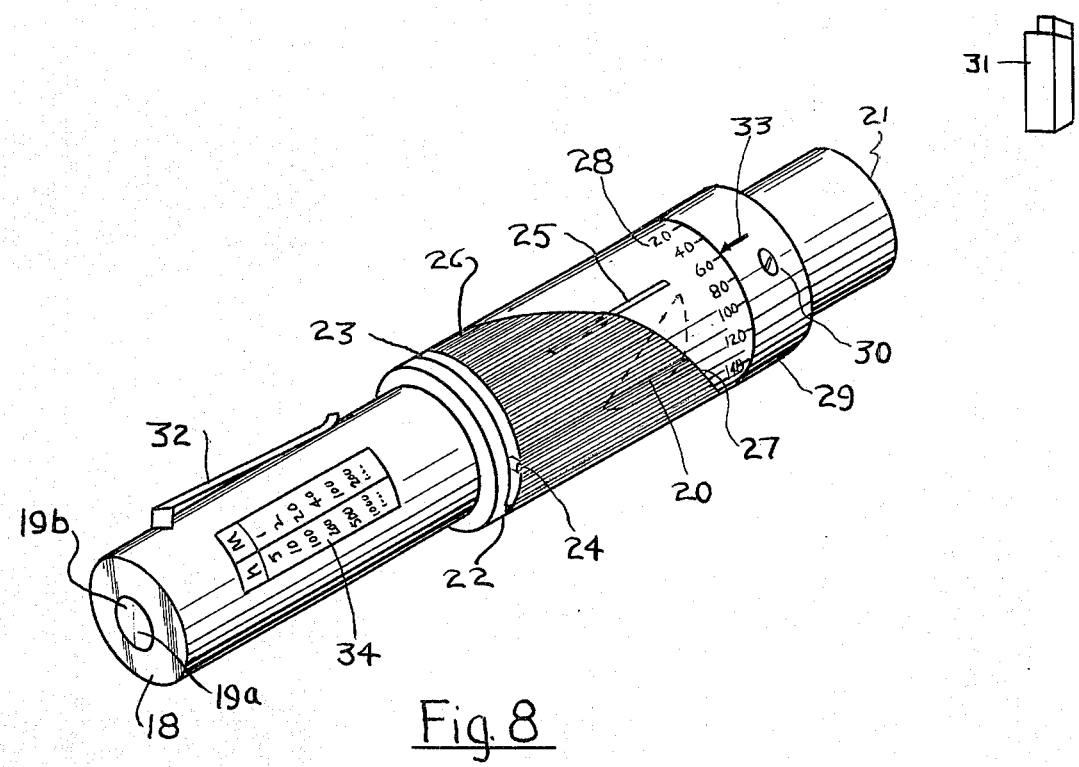

FIG. 8 is a perspective of a preferred embodiment of the invention.

The general method of operation can be explained with reference to FIG. 1. It is desired to find the range $R$ of a target whose height $h$ is known. A rod is held at a fixed distance $d$ from the eye and its length is changed until there is correspondence to the height of the target. When this has been done, the range is given by the equation $$R = h\, d/s$$

If $h$ and $d$ are constant, the only variables are the rod length $s$ and the range $R$. The equation therefore becomes $$R = k/s$$

where $k$ is a constant

This equation describes a hyperbola a graph of which appears in FIG. 2. It can be seen that the decrease of $s$ with distance is very rapid at first but becomes more and more gradual as the observer moves away from the target. If the observer makes a small error $\Delta s$ in adjusting the height of the rod with a close-by target, the resulting error in distance is $\Delta R_1$, a relatively small amount. If the target is further removed, however, the same error, $\Delta s$, will have a much greater effect — $\Delta R_2$. It is important therefore to minimize $\Delta s$.

Another characteristic of this kind of measurement is the difficulty of estimating values intermediate between inscribed numbers. The ranges indicated in FIG. 2 by way of example show that the spacing between 50 and 100 is much greater than between 100 and 200. It is possible for the observer to make a large error in attempting to assign a value to an indication which falls between 50 and 100.

According to this invention the height of the reference line to which the target is compared is observed under magnification and is varied in proportion to a hyperbolic curve. The magnification permits the height to be adjusted so as to minimize error. The hyperbolic relation between the adjusting means and the height of the reference line produces a linear calibration. Intermediate values are readily estimated.

Referring now to FIG. 3 one embodiment of my invention can be seen to be comprised of a housing 1 containing a slit 2, an internally mounted mirror segment 3, an eyepiece 4, an externally mounted transparent disk 5, a fiducial mark 6 and a window 7. The disk 5 is rotatably fastened to housing 1 on the shaft 8. The bottom of disk 5 is blackened to form the hyperbolic curve 9. The blackening may be applied by the use of a spray paint and a mask, by means of precut sheet which is fastened to the bottom of disk 5 by adhesive or other means or by a photographic process. The edge of disk 5 is inscribed with numbers which correspond to various distances and constitutes the reading scale of the range finder.

The mirror segment 3 is mounted segment is mounted in an inclined position so that an observer looking through the eyepiece 4 obtains a view of slit 2. Mirror segment 3 occupies only a part of the cross section of the housing 1 to permit the observer to view the target alongside of the slit. Light entering the slit through the transparent disk 2 is reflected by mirror segment 3 into the right hand side of the eyepiece 4. The range finder is held so that the target 11 can be seen through the left side of the eyepiece 4. It will be apparent that the length of the slit seen by the observer will depend on the position of the disk 5. By turning the disk the observer can block out more or less of the entering light because he moves a greater or lesser area of the blackened curve 9 over the slit 2.

The view through the range finder when it has been set for a target is shown in FIG. 4. The target height in this case has been matched by the length of the slit visible in the eyepiece. The observer now reads the distance on disk 5 as shown in FIG. 3 opposite the fiducial mark 6.

The range finder is sealed against dust and moisture by the window 7 in FIG. 3.

In FIG. 5 is shown a modification of the disk. In addition to the scale 10 inscribed at the edge of the disk there are club numbers 12 which permit a golfer to choose a recommended iron for a given distance to the green.

In FIG. 6 are shown details of the eyepiece 4 of FIG. 3. The eyepiece is comprised of a lens section 4a and a plain glass section 4b. The lens section produces a virtual image of the slit 2 so that the observer can keep both the target and slit in sharp focus.

A modified eyepiece which can be used in the embodiment of FIG. 3 is shown in FIG. 7. The lens 14 produces a virtual image of the slit which is transmitted through the partially silvered mirror 13. The target is viewed after two reflections: one from the fully silvered mirror 15 and one from the partially silvered mirror 13.

A preferred embodiment of my invention is shown in FIG. 8. A tubular housing 18 contains the eyepiece assembly 19, a semicircular mirror 20 and the transparent end window 21. A transparent, rotatable and coaxial cylinder 22 is positioned on the tubular housing 18. Cylinder 22 contains the slot 23 and is restrained from rotating through a complete 360 degrees by the pin 24. Cylinder 22 contains on its lower surface a darkened area 26 terminating on one side in the hyperbolic curve 27. The edge of cylinder 22 is inscribed with the scale 28. A slit 25 is cut in the tubular housing 18. Light entering through the transparent coaxial cylinder 22 will be partially blocked by the hyperbolic curve 27, will illuminate slit 25 and by means of the mirror 20 and the lens portion 19a of the eyepiece 19 will form a magnified reference line. Rotation of coaxial cylinder 22 will increase or decrease the size of the reference line so that the user can adjust it to match the perceived height of the target 31.

In this preferred embodiment of my invention a collar 29 carrying the fiducial mark 33 is held from sliding and turning by the set screw 30. The user can realign the fiducial mark with the scale 28 should the instrument become misaligned with rough handling.

The preferred embodiment of my invention shown in FIG. 8 can be constructed as a general purpose range finder and calibrated for example in terms of a target dimension of 5 units. A table of multipliers 34 would then be imprinted on the side of the tubular housing 18. The user can select the proper value of multiplier M opposite the value of $h$, the height of the target he is using. The reading taken from scale 28 is then multiplied by M. If $h$ represents the target height in feet, then the range will be in feet; if $h$ is estimated in yards, the range will be in yards, etc.

A clip 32 attached to tubular housing 18 facilitates the carrying of the range finder in a pocket of a shirt or jacket.

It will be apparent that other embodiments of and additions to the invention are possible. For example a small, battery operated lamp can be added near the slit of the invention to permit the range finder to be used at night with dimly lit targets. It would also be possible to employ gear drives and vernier scales to achieve more accuracy in changing the length of the reference line and in reading the scale. These and other variations in construction may be made without departing from the principles of the invention as set forth in the following claims.

I claim:

1. A range finder for determining distances between an observer and an object of known dimension comprising a housing, a slit cut into the side of said housing, a rotatable transparent disk mounted over said slit, a thin sheet of dark material cut on one edge into the form of a hyperbolic curve and attached to said disk, a scale marked on the rim of said disk, a reflector positioned within said housing and a two component eyepiece fixed into one end of said housing whereby the observer can simultaneously view said object and a magnified image of said slit side by side and can vary the length of the image of said slit by rotation of the disk in order to expose varying lengths of the slit to incoming light and can then read the distance to the object from said scale.

2. A rangefinder as set forth in claim 1 in which a transparent disk carrying a scale of distances is also provided with an additional scale of recommended club numbers for use by golfers.

3. A range finder for determining the distances between an observer and an object of known dimension as set forth in claim 2 comprising a housing having a slit of variable effective length, a reflector mounted within said housing and an eyepiece containing a half-silvered reflector, a fully-silvered reflector and a magnifying lens whereby the observer can view said object and an image of said slit in superimposed position and can adjust the length of said image to match the length of said object in order to obtain an indication of said distance.

4. A range finder for determining distances between an observer and an object of known dimension comprising a tubular housing, a slit cut into the side of said housing, a transparent cylinder coaxially and rotatably mounted over said tubular housing and over said slit containing on its inner surface a thin sheet of dark material cut on one edge into the form of a hyperbolic curve, a scale marked on one end of said cylinder, a reflector angularly fixed within said housing and a two part eyepiece mounted into one end of the housing whereby the observer can view the object alongside a magnified image of said slit, can match the length of said image to the known dimension of the object by rotating said coaxially mounted cylinder and can then read the distance of the object from the scale mounted on said cylinder.

* * * * *